(12) United States Patent
Carbonera et al.

(10) Patent No.: US 9,927,803 B1
(45) Date of Patent: Mar. 27, 2018

(54) AUTOMATED BUSHING CONSTRUCTION FOR LATHE TURNING

(71) Applicant: Proto Labs, Inc., Maple Plain, MN (US)

(72) Inventors: Carlos Carbonera, St. Paul, MN (US); Phillip Jason Schmidt, Minneapolis, MN (US); Stefan Emilov Atev, Minneapolis, MN (US); Robert Bannick, Albertville, MN (US)

(73) Assignee: Proto Labs, Inc., Maple Plain, MN (US)

( * ) Notice: Subject to any disclaimer, the term of this patent is extended or adjusted under 35 U.S.C. 154(b) by 528 days.

(21) Appl. No.: 14/597,653

(22) Filed: Jan. 15, 2015

Related U.S. Application Data

(63) Continuation of application No. 14/282,404, filed on May 20, 2014, now abandoned.

(60) Provisional application No. 61/942,523, filed on Feb. 20, 2014.

(51) Int. Cl.
*G05B 19/4097* (2006.01)
*B23Q 1/76* (2006.01)
*G06F 17/50* (2006.01)

(52) U.S. Cl.
CPC ......... *G05B 19/4097* (2013.01); *B23Q 1/766* (2013.01); *G06F 17/50* (2013.01)

(58) Field of Classification Search
None
See application file for complete search history.

(56) References Cited

U.S. PATENT DOCUMENTS

| | | | |
|---|---|---|---|
| 4,218,051 A | 8/1980 | Stastny | |
| 5,133,566 A | 7/1992 | Baker | |
| 6,679,503 B2 | 1/2004 | Yamazaki et al. | |
| 6,786,802 B2 | 9/2004 | Council, Jr. et al. | |
| 2006/0079987 A1* | 4/2006 | Cha | G05B 19/4097 700/173 |
| 2010/0319502 A1* | 12/2010 | Harrison | B23B 31/4006 82/1.11 |

* cited by examiner

*Primary Examiner* — Paul Yanchus, III
(74) *Attorney, Agent, or Firm* — Shewchuk IP Services, LLC; Jeffrey D. Shewchuk

(57) ABSTRACT

A process for creating custom fixtures for parts that are to be CNC lathe machined is fully automatic and requires no human interaction. The customer's CAD file is computer analyzed to determine whether the part's dimensions fit within an available CNC lathe turning center for forming out of a cylindrical stock bar. The longitudinal axis is identified, and a set of tool paths is developed for cutting the part from two respective directions. A corresponding tool path is developed for CNC lathe cutting a bushing, preferably from the same bar stock, which generally represents the negative space around circular cross-sections of the part, in monotonically increasing diameters from the first end of the part. The bushing is then used to hold the part in the chuck during machining the second end of the part from the opposite direction.

20 Claims, 6 Drawing Sheets

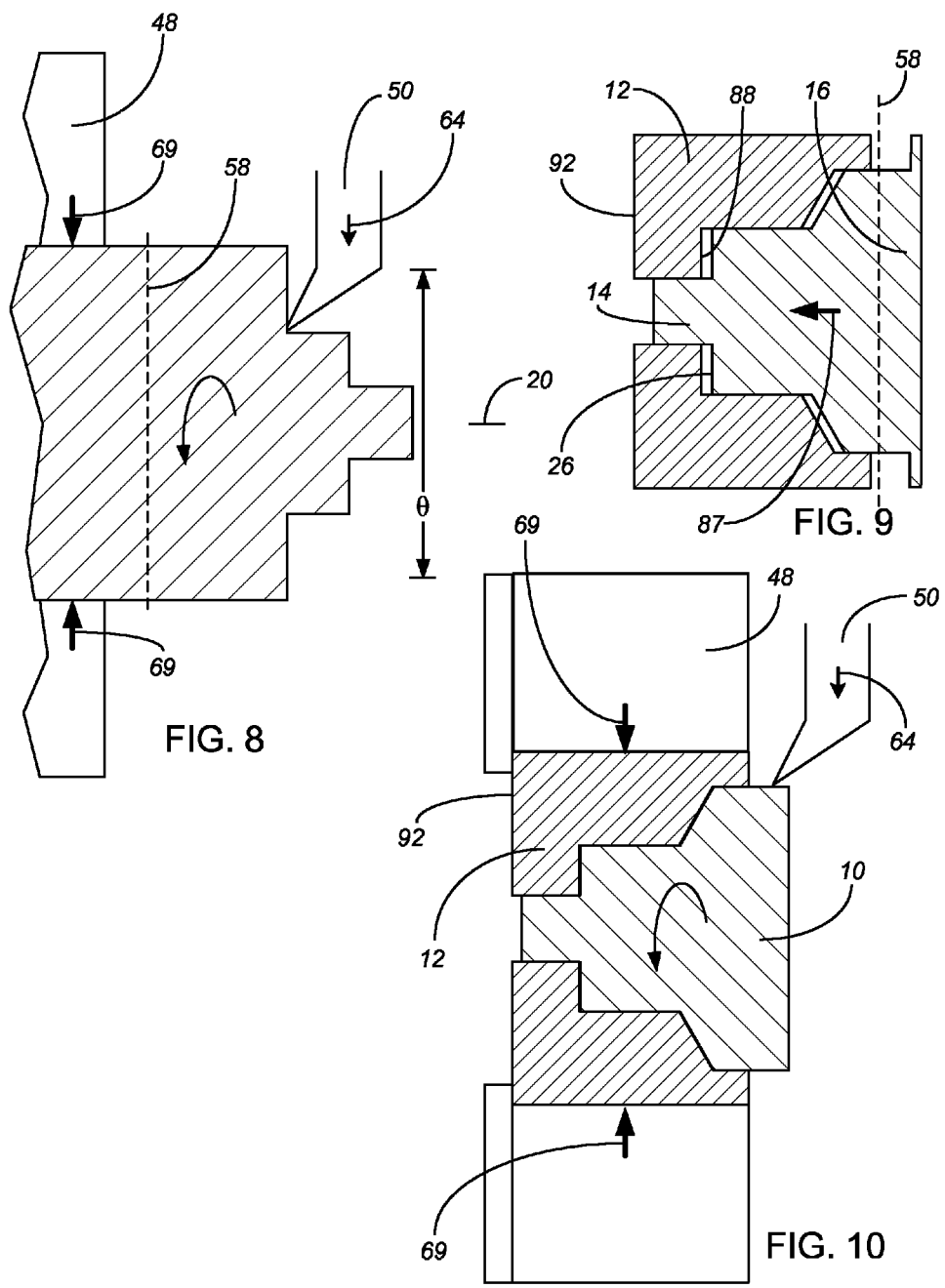

US 9,927,803 B1

AUTOMATED BUSHING CONSTRUCTION FOR LATHE TURNING

CROSS-REFERENCE TO RELATED APPLICATION(S)

The present application claims priority from Provisional Application No. 61/942,523, filed Feb. 20, 2014 and entitled "Automatic Fixture For Lathe Turning".

BACKGROUND OF THE INVENTION

The present invention relates to software supported methods, systems and tools used in the design and fabrication of custom parts which are machined on a CNC lathe, as well as to automated fixturing of such parts using a bushing.

Computer Numerical Control machining, or "CNC" machining, has become a prevalent way to machine high accuracy parts and injection molds. In certain applications, considerable work has been accomplished to automate the process for writing CNC machining instructions, using a CAD file provided by a customer which defines the shape of the part to be made. Considerable work has also been accomplished in providing quotations for parts machined or molded using those CNC machining instructions. Examples of such applications are explained in U.S. Pat. Nos. 8,239,284, 8,295,971, 8,140,401, 7,957,830, 7,840,443, 7,836,573, 7,630,783, 7,590,466, 7,574,339, 7,496,528, 7,299,101, 7,123,986, 7,089,082, 6,836,699 and 6,701,200, all assigned to the assignee of the present invention and all incorporated by reference. In the examples disclosed therein, the CNC machining was most commonly performed on a three-axis CNC mill. When the machining is to create an injection mold, the exterior-generally-rectangular-prism-shape of the mold is not defined by the customer's CAD file, so fixturing to hold the mold block during machining is relatively trivial. In contrast, when "total profile machining" is performed in the three-axis CNC mill so as to directly machine a part, fixturing is often an issue. See in particular U.S. Pat. Nos. 7,836,573, 7,840,443, 7,957,830 and 8,239,284.

While many (if not all) of the teachings of these incorporated-by-reference patents are equally applicable to both three-axis CNC milling and CNC lathe machining, there are many parts for which CNC lathe machining is more efficient than three-axis CNC milling. In a three-axis mill, the stock is held stationary relative to a high-speed rotating tool, whereas in a lathe the stock is rotated at high speed relative to a low-speed moving tool. Generally, parts which have cylindrical or circular profiles about a characteristic longitudinal axis are more efficiently machined using a CNC lathe than using a CNC three-axis mill. Lathe machining can increase efficiency both in terms of the cost of stock material (i.e., less waste), in terms of the duration of machining required, and in terms of reduced tool wear of that machining.

A common issue in lathe machining of a part is that while the part is being held at one end/rotated by the chuck, the cutter cannot cut the portion of the part that is in contact with or closest to the chuck. To be able to cut the portion of the part in contact with or closest to the chuck, a skilled machinist often first creates a custom fixture. The machinist then needs to take the workpiece out of the chuck, flip the orientation of the workpiece, put it in the fixture, and have the chuck hold the fixture/part from its opposite end.

Fixturing methods can be devised which are better suited for lathe machining than using the prior art fixturing methods which are equally applicable to three-axis milling. The present invention is particularly intended to capitalize on increased efficiency obtained by automated CNC lathe machining of certain parts.

BRIEF SUMMARY OF THE INVENTION

The present invention is a method of automated, custom lathe machining of a part, and a bushing which can be used in that automated lathe machining method. The method analyzes a customer's CAD file and generates machining instructions for both the part and its mating bushing on a CNC lathe. The part is machined in two orientations, and is held in the chuck by the bushing during the secondary machining direction. The bushing has a cylindrical shape with an inside cavity, preferably of circular cross-section throughout its depth and monotonically decreasing in diameter with depth into the bushing. A compression slot is formed in the bushing which enables the bushing to transfer the grip force from the chuck of the CNC lathe to the part without any damage to the part.

BRIEF DESCRIPTION OF THE DRAWINGS

FIG. 8 is a simplified cross-sectional side view showing machining of the first end of the part of FIGS. 1 and 2 out of bar stock.

FIG. 9 is a simplified cross-sectional side view showing insertion of the part (second end machining not yet completed) of FIGS. 1, 2 and 8 into the bushing of FIGS. 6 and 7.

FIG. 10 is a simplified cross-sectional side view showing machining of the second end of the part of FIGS. 1 and 2 while using the bushing of FIGS. 6 and 7.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
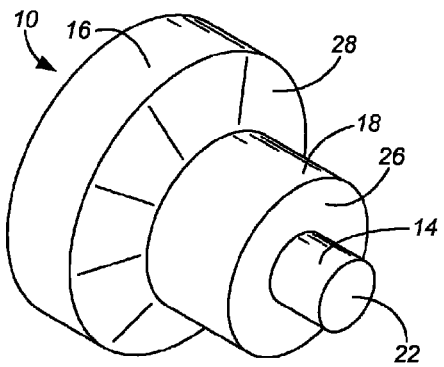
FIG. 1 is a perspective view of an exemplary part desired by a customer.
Figure 6:
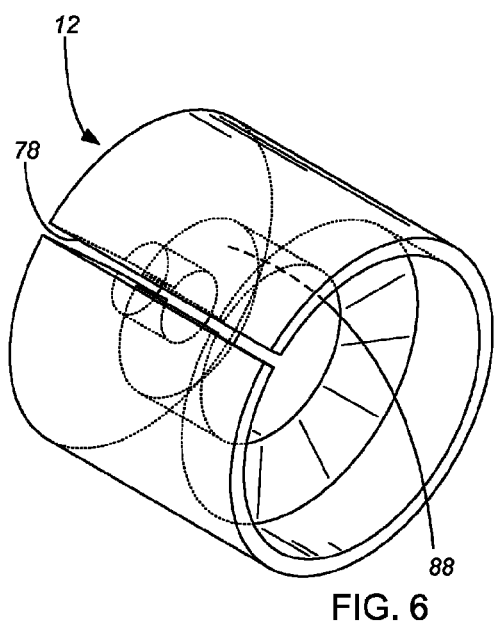
FIG. 6 is a perspective view of a preferred bushing for use with the part of FIGS. 1 and 2, with hidden lines shown dashed.

FIG. 1 shows a first exemplary part 10 for discussion purposes of the present invention, which will be CNC machined such as using the bushing 12 shown in FIG. 6 as will be explained. The part 10 is custom designed by a customer, the shape of which is therefore not known at the time that software performing the present invention is written. In part because the part 10 is custom-designed (i.e., not a staple article of commerce) by or for this particular customer, the part 10 includes features which do not have commonly accepted names. In this example, the part 10 is represented by a small cylindrical end 14, an opposing large cylindrical end 16, and a mid cylindrical portion 18 between the small cylindrical end 14 and the large cylindrical end 16. Each of the small cylindrical end 14, the mid cylindrical portion 18 and the large cylindrical end 16 have a common longitudinal axis 20. The small cylindrical end 14 terminates in a planar, circular small face 22, while the large cylindrical end 16 terminates in a planar, circular large face 24, both perpendicular to the longitudinal axis 20. A midwall 26 between the small cylindrical end 14 and the mid cylindrical portion 18 is also planar and perpendicular to the longitudinal axis 20. A transition wall 28 between the mid cylindrical portion 18 and the large cylindrical portion 16 is conical about the longitudinal axis 20.

Figure 3:
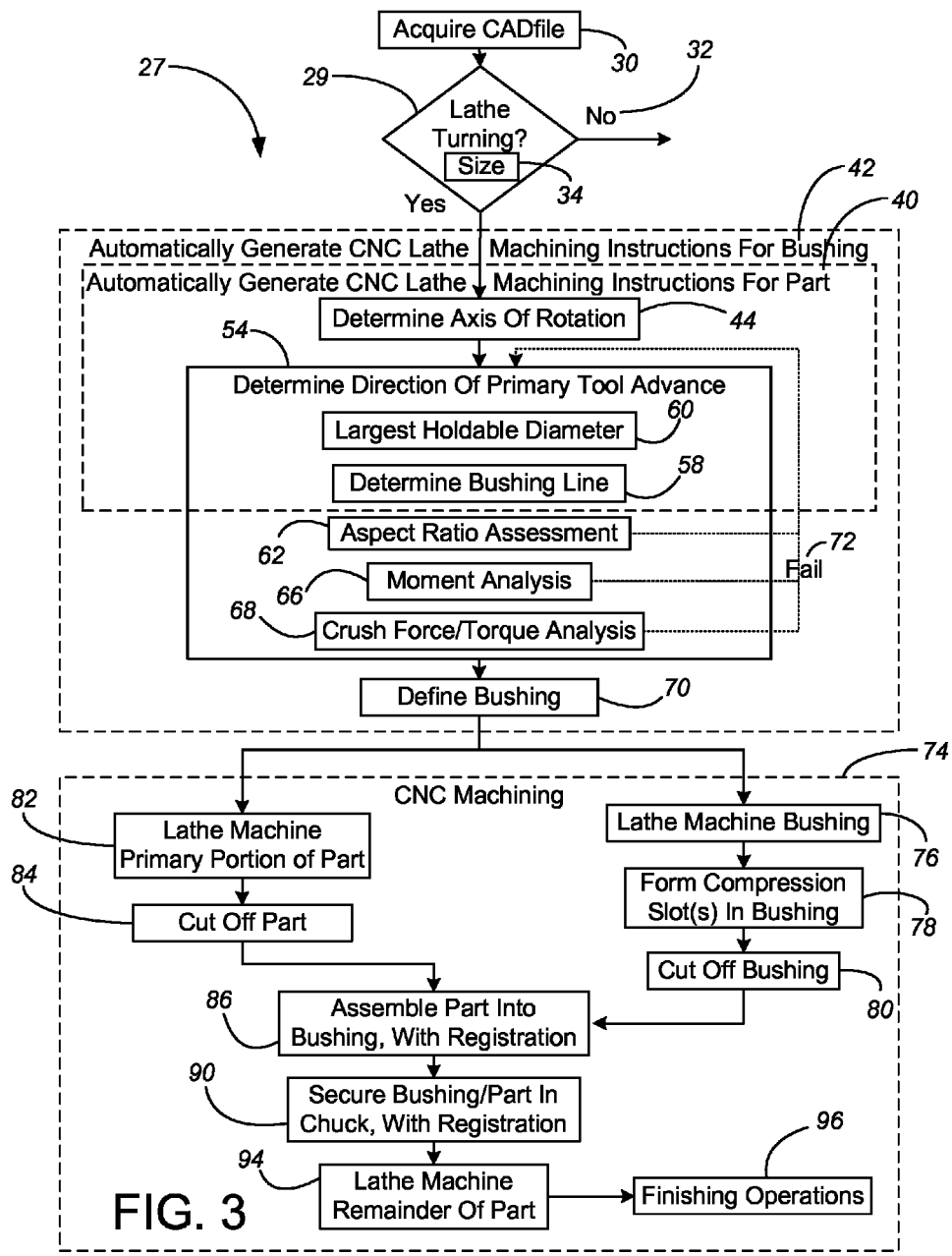
FIG. 3 is a flow chart summarizing the software-enabled method of the present invention.

Workers skilled in the machining arts will quickly recognize that the part 10 has a characteristic longitudinal axis 20 and can be efficiently formed in a lathe using cylindrical bar stock rotated about the characteristic longitudinal axis 20. As a first step in the preferred method 27 shown in FIG. 3, software analyzes 29 a customer's CAD file 30 and determines that a majority of the surface area (in this case the entirety of the surface area) is rotationally symmetrical when the part 10 is rotated about its characteristic longitudinal axis 20. The CAD ("Computer Aided Design") file 30 is a digital representation of the mechanical part provided by the customer. When created in CAD software, CAD files often define the part surface profile relative to a defined axis (for instance, the shape of part 10 can be defined in the CAD file 30 as the union of three cylinders and a cone, all about the characteristic longitudinal axis 20), so determining 29 whether a majority of the surface area of the part 10 can be formed by a lathe via software analysis of the CAD file 30 is not overly difficult once the CAD file format is known. The preferred embodiment can perform this software analysis 29 on IGES, STL or various other CAD file formats, and is compatible with all the commercial CAD products currently in widespread use.

If the surface area of the part is not amenable to lathe machining, the part can be further analyzed and machined 32 with prior art processes outside the scope of this invention. Alternatively, systems could be designed to utilize the bushing concepts of the present invention for use in fixturing a part on a CNC three axis mill. However, the method of the present invention is primarily applicable to parts which are to be machined using a CNC lathe, and the example parts 10, 110, 210 discussed herein all are machined using a CNC lathe.

Figure 4:
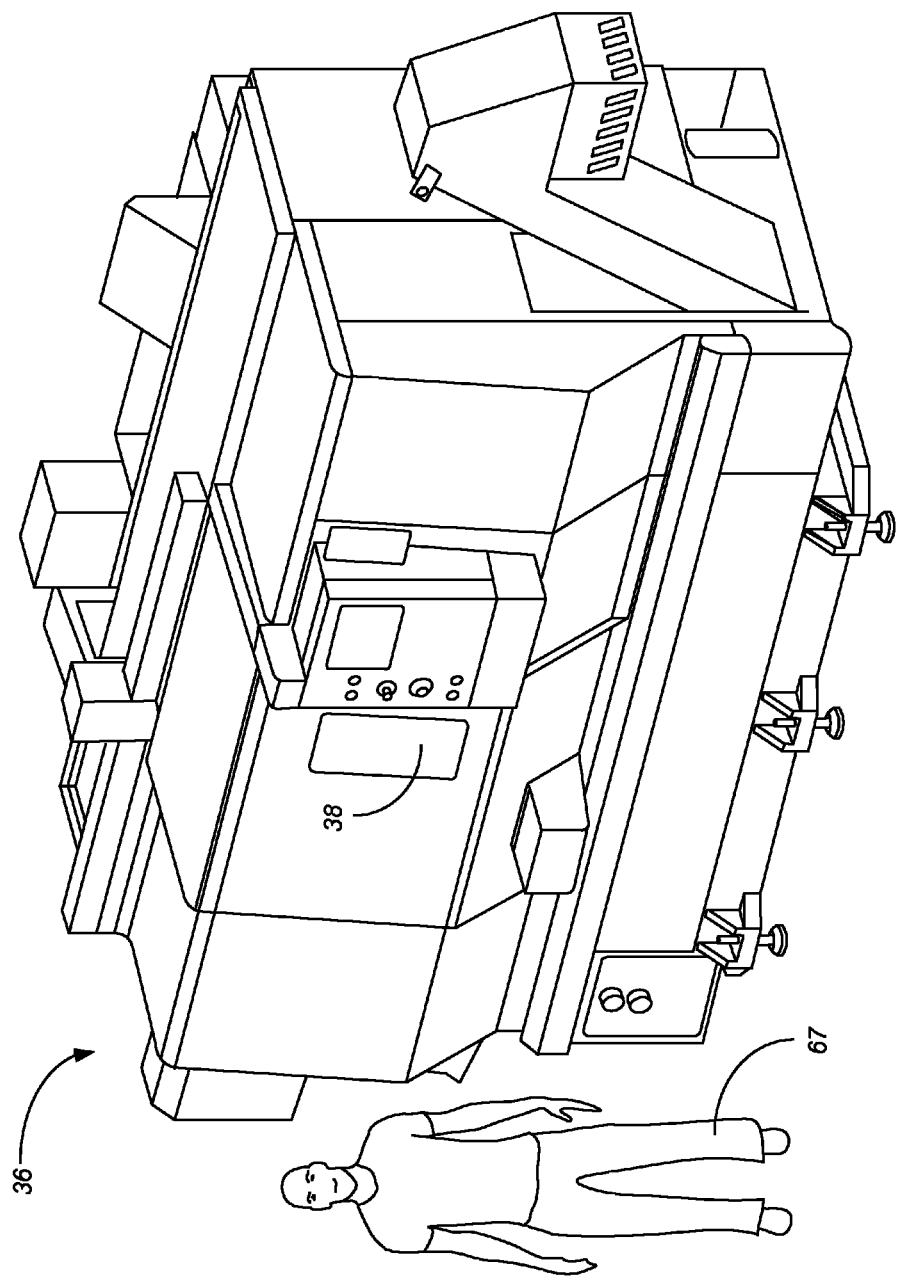
FIG. 4 is a perspective view of a preferred CNC lathe which can be used in the method of the present invention, shown with an operator standing nearby to give an indication of scale.
Figure 5:
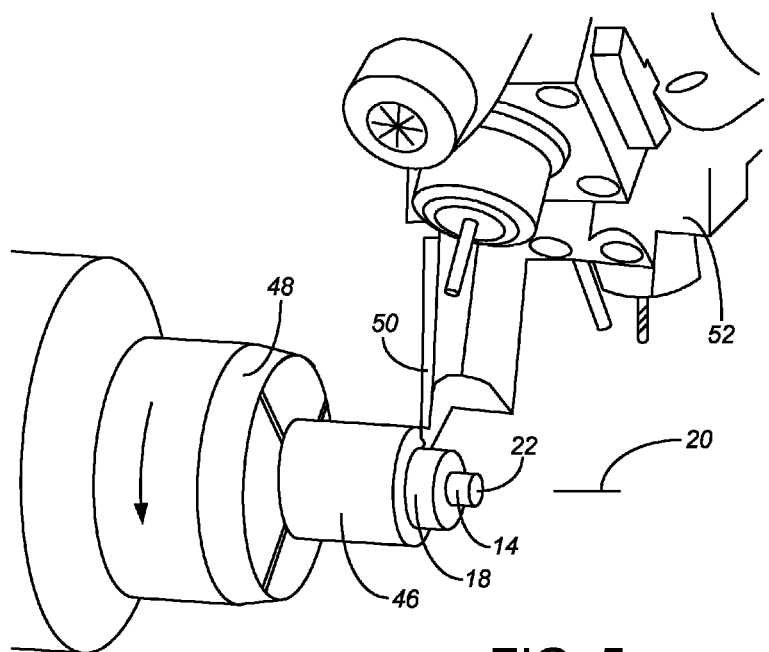
FIG. 5 is a perspective view of the CNC lathe machining of one end of bar stock into the part of FIGS. 1 and 2.

Any particular CNC lathe being used has a maximum diameter and length of machining area available. As part of the determination 29 of whether the part 10 will be formed by CNC lathe turning, the CAD file 30 for the part 10 is analyzed to determine if it fits within the maximum diameter and length constraints 34. As depicted in FIGS. 4 and 5, a preferred CNC lathe 36 for performing the process is a model DS-30SSY CNC Lathe from Haas Automation, Inc. of Oxnard, Calif. This particular lathe 36 has a 16 in. (diameter)×23 in. (406 mm×584 mm) maximum capacity of the machining area behind the window 38, but any other CNC lathe can be equivalently used. As part of the determination as to whether this part 10 will be machined in a CNC lathe 36, the preferred software analyzes the maximum diameter and length defined by the CAD file 30. The system 27 may further constrain the size so the bushing 12 can be adequately received in the chuck 48 and support the part 10, with a preferred length maximum of 8 inches. In this example, the exemplary part 10 happens to be about 1.8 inches in diameter and 1.7 inches long, so it easily fits within the maximum diameter and length constraints 34 of the preferred CNC lathe 36.

If the part is to be machined with a CNC lathe, the software further analyzes the CAD file 30 to determine CNC instructions 40 for lathe machining the part, which in many ways is similar to the software algorithms used to determine CNC machining in a three-axis mill. At the same time, the software analyzes the CAD file 30 to determine CNC instructions 42 for lathe machining a bushing, which bushing mates with the part and will be used to hold the part in the secondary machining direction.

While other shapes of stock could be used, preferably the part 10 is machined from cylindrical bar stock of the material for the part. As known in the machining arts, any of numerous materials can be formed using the lathe 36. In the preferred system, either the CAD file 30 contains a definitional attribute which defines the material of the part, or the customer is presented with a menu of available materials from which the part can be lathe machined, preferably based upon the various types of bar stock maintained in inventory. For purposes of this example, the customer has selected that the part 10 be formed out of annealed 6061 aluminum.

The CAD file 30 is analyzed 44 to determine the axis of rotation 20. The CAD file 30 will ordinarily define one or more portions of the part surface profile as being circular about the characteristic axis of rotation 20. The greatest extent of the part 10 from the axis of rotation 20 is determined, to select a diameter of available aluminum bar stock which can be used in forming the part 10. In this example, the large cylindrical end 16 is the portion of largest diameter, defined in the customer's CAD file 30 to have a diameter of about 1.8 inches, meaning that the part 10 can be conveniently lathe machined out of 2 inch diameter annealed 6061 aluminum bar stock 46 maintained in inventory. In a preferred embodiment, diameters of ½", 1", 1½", 2", 2½" and 3" of several common materials are maintained in inventory.

Figure 2:
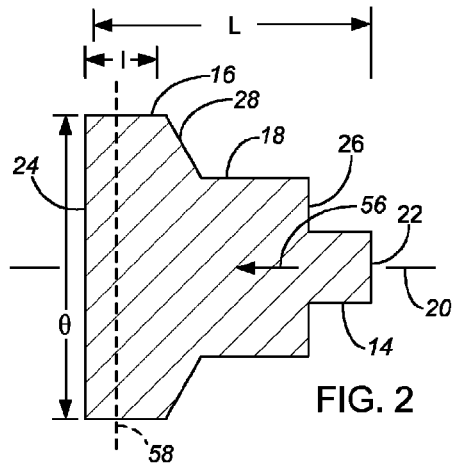
FIG. 2 is a cross-sectional side view of the exemplary part of FIG. 1.

In general, for any part shape to be lathe machined, the part surface profile is characterized by a profile of revolution, best shown for the example part 10 in FIG. 2. The profile of revolution is a two dimensional shape that when revolved around a given axis 20 of rotation/symmetry contains the part 10. The greatest diameter of the profile of revolution defines the smallest cylindrical volume that contains the part, i.e., the lowest diameter of bar stock which can be used for forming the part 10.

The types of different materials and the sizes of stock which could be maintained in inventory is essentially limitless, and the present invention applies regardless of the type of material and size of stock being used or maintained in inventory. However, if the customer has a part which is too large or is of a material which is not within bar stock inventory, the preferred software may generate a flag so appropriate material can immediately be ordered. Alternatively, the system may only accept parts of a material and size so as to fall within bar stock inventory, rejecting parts which are too large or of unusual materials. One preferred system rejects parts which are greater than 6 inches in diameter.

When turning and as shown in FIGS. 5, 7, 8 and 10, the workpiece is rotated around its axis of revolution 20, and a single point turning cutter 50 can be used to remove the unneeded material while the workpiece is held at only one end. Many additional machining operations can also be performed on the CNC lathe 36 (while the workpiece is rotating or not, and not shown in the examples), without detracting from the fact that the part 10 is more efficiently machined in a CNC lathe than on a CNC three axis mill. For instance, the preferred CNC lathe 36 has a twenty-four tool spindle 52, any tool of which can be used to remove material from the stock 46 while the stock 46 is held in the chuck 48. The sequence of instructions that define the trajectory to be followed by the single-point turning cutter 50 (or any of the other tools) to remove material from the 2 inch diameter stock 46 is the tool path.

After the axis of rotation 20 has been determined 44, the next act performed by the preferred software is to tentatively determine 54 the direction of primary tool advance. The part 10 will be machined in the CNC lathe 36 in two different sets of operations (i.e., two separate tool paths), by holding one end of the stock material 46 in the chuck 48 so the cutter 50 advances in the first (primary) direction, and then by flipping/reversing the part 10 and holding the part 10 in the bushing 12, with both the bushing 12 and the part 10 held in the chuck 48 so the cutter 50 advances from the opposite (secondary) end. The terms "direction of primary tool advance" and "direction of secondary tool advance", as used herein, are not intended to mean that the cutter 50 is only advanced in one direction (from right to left as shown in the figures), as many parts will be cut using Z-banding or similar sequences of material removal wherein the cutter 50 moves in alternating directions. Nor should one misconstrue that the present invention uses only a single cutter 50 in performing all the material removal steps. Instead, the term "direction of primary tool advance" and "direction of secondary tool advance" are directed at which end of the part 10 as defined by the CAD file 30 is held in the chuck 48.

In the preferred method, tentatively determining 54 the direction of primary tool advance is based upon a determination 60 of the largest holdable diameter of the part 10 relative to the length of the part 10. The determination 60 of largest holdable diameter of the part depends upon the crush force of the bushing versus the deformation strength of the material for the part. In general, the largest holdable diameter of the part will be a circular cross-sectional shape that exceeds a minimum threshold in length (e.g., that is not of knife edge), so as to provide a surface area at the largest holdable diameter where the bushing can grip the part. For instance, the software can look at the CAD file 30 for part 10 and identify that the entire length of the part involves circular cross-sections. Each of the circular cross-sections 14, 16, 18 extend without ridges for a length exceeding a minimum threshold. Additionally, the largest holdable diameter must be accessible from at least one end of the part without traversing a wider location of the profile of revolution.

When the largest holdable diameter exists in a cylindrical section (rather than, for instance, conical section) of the part, the algorithm 60 to select the tentative direction of primary tool advance looks at the largest holdable diameter from both ends. The largest holdable diameter from one end extends to the far end of the large cylindrical section 16 as indicated by length L in FIG. 2, while in the opposite direction the largest holdable diameter extends to the central end of the large cylindrical section 16 as indicated by length 1 in FIG. 2. Because the length L is greater than the length 1, the tentative primary tool advance direction will be as shown by arrow 56, to machine the small cylindrical section 14 first out of the stock 46.

After the tentative direction of primary tool advance is selected, the software determines a bushing line 58 for the part 10. The bushing line 58 is how far the part will be received in the bushing 12 for the secondary direction of machining. The bushing line 58 will generally extend so that as much of the part as possible is machined during the primary tool advance, to a minimum length required for machining in the secondary tool advance direction. For instance, the software can look at the large cylindrical section 16 and select a bushing line 58 which is as close as practicable to the end of the large cylindrical section 16, such as 0.05 in. (1.2 mm) from the end of the large cylindrical section 16, placing the bushing line 58 about 1.65 inches from the opposing end 14 of the part 10. Machining in the primary direction will proceed past the bushing line, whereas machining in the secondary direction will stop short of the bushing line. For most parts, 50% or more of the surface area of the part will be machined in the primary direction, with 50% or less of the surface area of the part machined in the secondary direction. It is preferred that the primary direction machine as much of the part as possible, and in many cases 80% or more of the part will be lathe machinable in the primary direction. It is generally preferred, but not necessary, for machining in the primary direction to proceed only slightly (such as a millimeter or two) past the bushing line, but in some instances (to pass all the verification algorithms discussed below) machining in the primary direction will proceed significantly past the bushing line. The most preferred bushings contain 90% or more of the part.

Once the bushing line is determined for the tentative direction of primary tool advance, several further verification algorithms are run to ensure that the tentative direction of primary tool advance and the bushing line are workable. An aspect ratio assessment 62 of the stock is made during the direction of primary tool advance. The cutting tool places a force on the stock/part during cutting, most often loading the cutting location downward in the CNC lathe as depicted by the arrow 64 in FIG. 8. This force must be withstood as a bending stress across the length of the stock/part that extends out of the chuck/bushing, i.e., from approximately the bushing line to the end of the part. In this example, the diameter of the large cylindrical section 16 is about 1.8 inches. The software tentatively selects that the part 10 will be made out of the next larger stock, such as 2 inch diameter bar stock 46. During lathe machining, the diameter of the stock withstands the bending stress, without deflection of a magnitude that it introduces error into the shape of the machined part. This means that the cutting force 64, applied over a 1.7 inch long, 2.0 inch diameter circular beam, cannot bend the stock 46 beyond the tolerance required of the part 10. Most parts will pass the aspect ratio assessment of the stock just based upon the stock required to meet the largest diameter of the part. However, for long, thin parts, it may be necessary to increase the size of the stock so bending deflection over the length of stock extending out of the chuck 48 is not problematic. One preferred algorithm requires the stock to have a diameter which is at least ⅙$^{th}$ of the length of the part. Additionally, for long, thin parts where the largest holdable diameter occurs as a long cylinder at one end of the part, it may be desirable to move the bushing line closer to the middle of the part, so the length of stock extending outside the chuck 48 during the primary tool advance direction is closer to the length of part extending outside the bushing 12 during the secondary tool advance direction.

An optional next step is to perform an aspect ratio assessment of the stock/part during the secondary tool advance. When the exemplary part 10 is held in the bushing 12, the bending stress of the cutting force is applied over only about a 0.2 inch long length. Once again, the cutting force cannot bend the part 10 beyond the tolerance required of the part 10. When the bushing line is close to one end of the part so the majority of the surface area of the part is machined in the primary direction, parts will usually clearly pass the secondary direction aspect ratio assessment. However, the secondary direction aspect ratio assessment is particularly important in cases where a crush force assessment requires reversing the part (so the direction of primary tool advance is from the opposite end than the end tentatively selected).

The next preferred step is to perform a moment analysis 66 of the part 10 during the secondary tool advance. (There is no need to perform a moment analysis on the bar stock during primary tool advance, because the bar stock can be as long as desired to withstand the cutting force moment.) The cutting force during secondary tool advance is withstood based upon the length of the part 10 residing within the bushing 12 and based upon the locations that the bushing 12 grips the part 10. In this case, the small cylindrical section 14 has adequate surface area so the bushing 12 can grip both the small cylindrical section 14 and the large cylindrical section 16. With only about 1 mm of the part being machined in the secondary tool advance shown in FIG. 10, the moment of the cutting force 64 on the part 10 is small and easily withstood by the distance from the end of the small cylindrical section 14 to the bushing line 58. However, sufficiently thin and wide disc-shaped parts will fail the moment analysis 66.

Another verification algorithm is to perform a crush force analysis 68 of the part 10. The crush force analysis 68 is essentially an area-of-contact analysis relative to a maximum permissible stress on the material of the part. The part is only gripped by the bushing on areas of the part which are a) circular in cross-section; b) which extend longitudinally beyond a minimum distance (i.e., are not a circular knife edge); and c) are not "shadowed" in the direction of primary tool advance. In this example, the entirety of the part 10 is circular in cross-section, and the part 10 contains no circular knife edges. Moreover, when looking at the part 10 in the tentative direction of primary tool advance, the diameter of the part 10 monotonically increases. Accordingly, the bushing 12 can contact and grip the part 10 along the entire length up to the bushing line 58. The surface area of all portions of this grip area is summed and considered relative to the inward force applied by the bushing 12. Working on a 5 inch diameter chuck 48 and powered by compressed air at 330 psi, the preferred CNC lathe 36 generates a chuck gripping force of about 6,000 lbs, depicted by arrows 69. While (depending upon its wall thickness and material) the bushing 12 will absorb some of the chuck force via its elastic deflection, preferably most of the chuck force on the bushing 12 will be transmitted to a bushing force gripping the part 10. The crush force analysis is heavily influenced by the material from which the part 10 is being lathe machined. For instance, annealed 6061 aluminum has a yield strength of about 8,000 psi. If the spring force compressing the bushing 12 absorbs none of the chuck gripping force, the part 10 would need at least 0.75 sq. inch of surface area in contact with the bushing 12 to withstand the chuck gripping force without plastic deformation. The preferred software thus looks at the surface area of the bushing 12 in contact with the part 10 to ensure that no plastic deformation occurs, for the material selected by the customer. By having the bushing line 58 as close as possible to an end of the part, the likelihood of passing the crush force analysis 68 increases, and the amount of cantilevering of the part during secondary tool advance is reduced.

As an alternative to having the crush force algorithm 68 be a pass/fail type of test, the crush force algorithm could generate an instruction telling the CNC lathe operator 67 that the air pressure powering the chuck 48 has to be dialed back for this particular part. Note however that decrease gripping force on the part could result in slippage of the part in the bushing, which generally results in destroyed or unsatisfactory parts.

The analysis of crush force 68 can also optionally consider torque required for turning of the part in the secondary direction. The maximum torque which can be transmitted from the bushing to the part depends upon the magnitude of the force delivered to the part, upon the radius at which that force is delivered, and upon the coefficient of friction between the bushing and the part. To accurately machine the part in the secondary direction, the part must not slip rotationally in the bushing. The preferred algorithm divides the gripping force F across the various surface areas A of the bushing in contact with the part, multiplies the gripping force portions by the radius r of each surface area, sums the resultant products and multiplies the sum by a coefficient of static friction $\mu_s$ for that particular material ($T=\mu_s \Sigma rF/A$). The preferred algorithm then verifies that the torque delivered to the part by the bushing exceeds the maximum torque delivered to the part by the cutting tool.

If the analysis of the part and its bushing passes all verification algorithms 62, 66, 68 to confirm the tentative selection of primary tool advance direction 54 and bushing line 58, then the bushing is fully defined 70 and the tool paths for both the part (40) and the bushing (42) are determined. The tool path for the bushing is generated by performing a Boolean subtraction of the polygon defined by the profile of revolution, but while never increasing the diameter of the Boolean subtraction. The preferred inside profile of the bushing is entirely defined by circular cross-sections. In the example part 10, the diameter of the part 10 itself is constant and/or monotonically decreases from the large cylindrical portion 16 to the small cylindrical portion 14, so the inside diameter of the bushing 12 can mate with the entire length of the outside diameter of the part 10 up to the bushing line 58.

As an alternative to considering only circular cross-sections when selecting the direction of primary tool advance, the algorithm to determine the direction of primary tool advance could look at the largest cross-section of the part, regardless of whether the cross-section at that location is circular or not. For instance (for other part shapes, such as if large cylindrical portion 18 was hexagonal rather than cylindrical), the algorithm might identify a hexagonal section as the largest cross-section, and tentatively select the direction of primary tool advance so the large hexagonal section was oriented toward the chuck 48. However, if the bushing cavity is entirely circular in cross-section, this might well place all or substantially all of the crush force of the bushing on the corners of the hexagonal section of the part. The benefit of considering only circular cross-sections when selecting the direction of primary tool advance is that this will generally place the crush force on a large surface area of the part.

In cases where the largest cross-section of the part is non-circular, the algorithm can give consideration to forming the bushing with a corresponding non-circular cavity shape, i.e., forming part of the recess in the bushing with a large, hexagonal cross-section. Of course, forming a non-circular recess in the bushing involves machining on the CNC lathe without the workpiece rotating, which is commonly a slower process than the machining required to create the preferred entirely circular cross-sectional shapes of the preferred bushings. If the tool paths for the bushing 12 are determined 42 as part of a quotation process for the part 10, the quotation can vary based upon the machinability of the bushing, i.e, based upon how long machining the bushing 12 will take and/or what tool wear will occur during machining of the bushing 12.

If the analysis of the part and its bushing fails 72 any of the verification algorithms 62, 66, 68, the preferred software reverses the part and re-performs the verification algorithms 62, 66, 68 to see if the part can be CNC lathe machined using the present invention and reversing the primary and secondary machining directions.

The method next proceeds with machining 74 of the part 10 and bushing 12. The part 10 and the bushing 12 need not be machined on the same CNC lathe, from the same stock, or in any particular order. However, the preferred system first machines and cuts off the bushing 12, then machines the part 10 in the direction of primary tool advance using the same bar stock and cuts off the partially completed part, and then machines the part 10 in the bushing 12 in the chuck 48 (while the stock has been pulled from the chuck). To ensure a sufficient wall thickness of the bushing 12, the preferred system places an additional constraint that the stock 46 must be at least 1/16" in diameter wider than the part 10, thereby ensuring that the bushing 12 formed of the same stock 46 has a wall thickness of at least 1/32".

Figure 7:
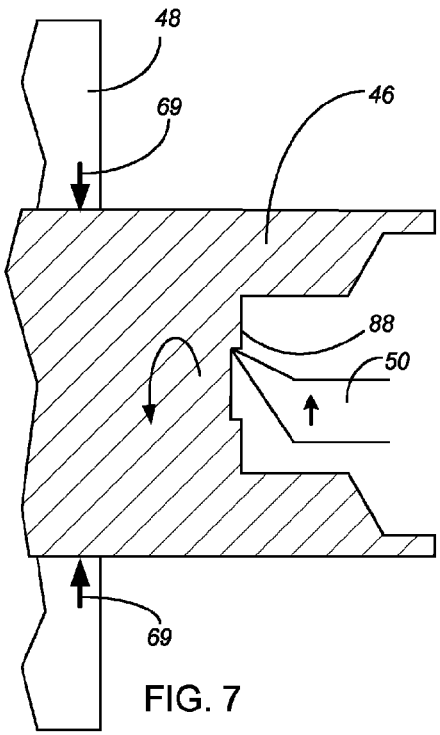
FIG. 7 is a simplified cross-sectional side view showing machining of the bushing of FIG. 6.

Lathe machining 76 of the bushing 12 is shown with reference to FIG. 7. The single point cutter 50 hollows out a section of the stock 46 with an inside diameter which is constant and/or monotonically decreases. The inside diameter of the bushing 12 matches the outside diameter at various locations on the part 10, in this example along substantially the entire outer surface of part 10 up to the bushing line 58. Once this interior female recess has been formed, the CNC lathe 36 preferably stops rotation of the stock 46 and cuts a single slit 78 longitudinally, throughout the bushing 12 from its outside diameter to its inside diameter. Alternatively, multiple slits (not shown) can be cut that do not extend longitudinally the entire length of the bushing. The slit 78 allows the bushing 12 to compress around the part 10 under the force of the chuck 48, so the bushing 12 will hold tight to the part 10.

After both the recess and the slit 78 are formed, preferably the CNC lathe 36 cuts off 80 the bushing 12 from the stock 46. Alternatively, either or both of the slit formation and the cut off can be performed separately outside the CNC lathe 36. One preferred method limits the length of the bushing 12 to at least 1" and no longer than 2", even if the bushing 12 does not reach to the far end of the part. Another preferred method further limits the length of possible cantilevering of the part outside the bushing line 56 to a maximum of 4".

Lathe machining 82 of the part 10 in the primary direction of tool advance is shown with reference to FIG. 8. The single point cutter 50 advances under its tool path as the stock 46 is rotating in the chuck 48, forming the outside diameter of the part 10 at least up to and preferably a short distance past the bushing line 58. Preferably the CNC lathe 36 cuts off 84 the partially formed part from the stock 46. If multiple identical parts are to be formed, a series of CNC lathe machining the primary direction of tool advance and cut offs can be performed (advancing the stock 46 for each part) without removing the stock 46 from the chuck 48. Alternatively, the cut off can be performed separately outside the CNC lathe 36.

Next the partially completed part is inserted 86 into the bushing, shown with reference to arrow 87 in FIG. 9. In addition to mating with the outside diameter of the part 10, the bushing 12 contains at least one surface which determines how far the part 10 can be inserted into the bushing 12, and thus serves to longitudinally register the location of the part 10 relative to the bushing 12. In this example, the bushing 12 contains a shoulder 88 which abuts against the transverse end 26 of the center cylindrical section 18 to register how far this part 10 will extend into the bushing 12.

The operator 67 next secures 90 the bushing 12, with the partially machined part therein, relative to the chuck 48. The bushing 12 preferably includes a face 92 which longitudinally registers the location of the bushing 12 relative to the chuck 48. Alternatively, a groove (not shown) can be formed in the outside surface of the bushing, with a snap ring inserted into the groove to provide a shoulder which longitudinally registers the bushing relative to the chuck 48. With longitudinal registration of both the part 10 relative to the bushing 12 and the bushing 12 relative to the chuck 48, the CNC tool path for the secondary tool advance direction will perform material cutting operations at the precise longitudinal location needed on the partially formed part 10.

The CNC lathe 36 completes its cutting operations 94 on the second end of the part 10. Both the completed part 10 and the bushing 12 can then be removed from the chuck 48, and the part 10 removed from the bushing 12. Any additional finishing operations 96 can be performed outside the CNC lathe 36, either using the bushing 12 to hold the part 10 or otherwise. The final part is then sent or otherwise provided to the customer. If desired, the bushing 12 can be reused for longitudinal registration and secondary tool advance for additional identical parts.

Figure 11:
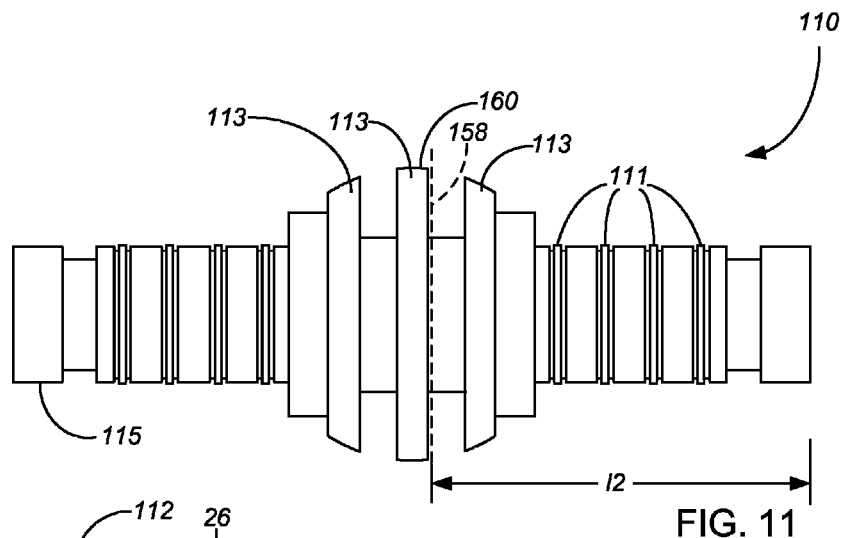
FIG. 11 is a side view of a second part in accordance with the present invention.
Figure 12:
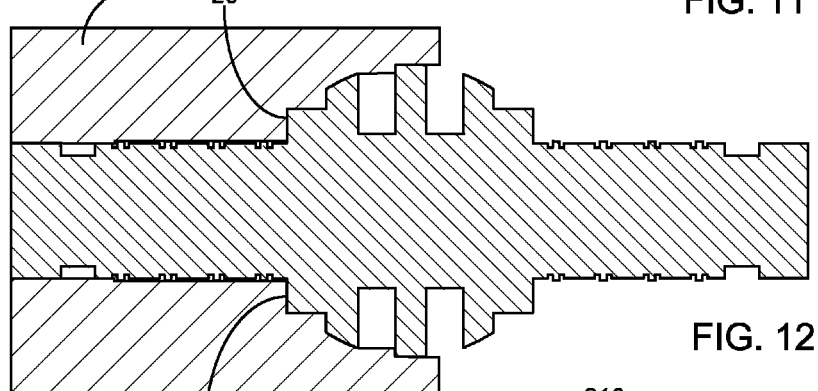
FIG. 12 is a simplified cross-sectional side view showing machining of the second end of the part of FIG. 11 while using its bushing.

FIGS. 11 and 12 show a second part 110 and bushing 112 used to hold the second part 110 during the direction of secondary tool advance. For this second part 110, the section of greatest diameter 160 is in the center of the part 110. Further, a series of ridges 111 are formed along the sides of the part 110. With this location of the section of greatest diameter 160 for this second part 110, only just past half of the part 110 can be tightly held by the bushing 112. Even with the bushing line 158 toward the center of the part 110, the primary advance can still machine the vast majority of the part 110. The series of ridges 111 prevent much of the part 110 from being in contact with the bushing 112 (remember, the ridge 111 closest to the end of the second part 110 determines a minimum inside diameter for all shallower depths into the bushing 112). With only a small surface area being able to be held in contact with the bushing 112, this part 110 nearly fails the crush force analysis 68. If the part designer wanted to place more ridges on the part (such as having each of the central sections 113 have a knife edge), there might not be enough surface area in contact with the bushing 112 to withstand the grip force of the bushing 112 without damage to the part 110, and an alternative fixturing method would have to be devised. With a long length 12 extending outside the bushing 112, this part 110 only passes the moment analysis 66 due to the smooth cylindrical surface 115 on the end. If the part designer wanted to place ridges all the way out to the ends of the part 110, or if the part designer wanted the ends of the part 110 to be hexagonal (or other shape) rather than cylindrical, so that the only location that the bushing 112 could tightly hold the part 110 was in the middle 113, the part 110 might fail the moment analysis 66, and an alternative fixturing method would have to be devised.

Figure 13:
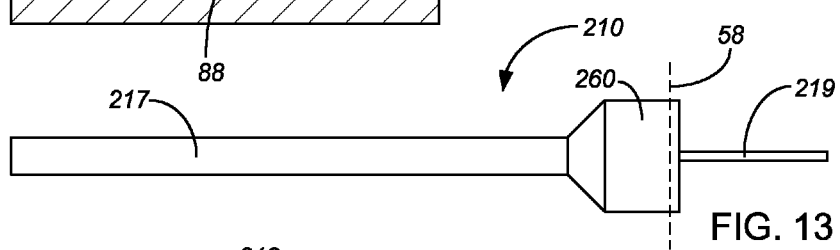
FIG. 13 is a side view of a third part in accordance with the present invention.
Figure 14:
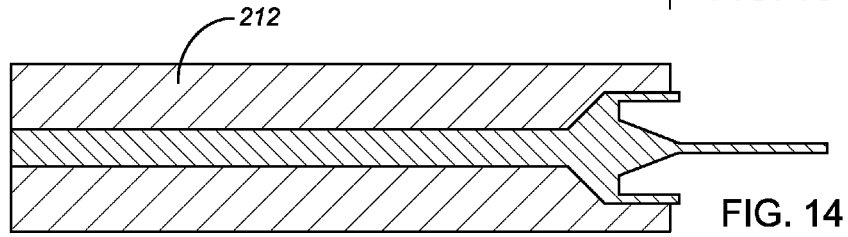
FIG. 14 is a simplified cross-sectional side view showing machining of the second end of the part of FIG. 13 while using its bushing.

FIGS. 13 and 14 show a third part 210 and bushing 212 used to hold the third part 210 during the direction of secondary tool advance. This third part 210 has two sections 217, 219 which are long and thin extending from the section of greatest diameter 260. Whether this part 210 passes both the aspect ratio assessment 62 and the crush force/torque analysis 68 depends upon the length of the part 210 relative to the diameter of the largest diameter 260, as well as the diameter of the stock used to create the part 210.

As shown by these examples, the method 27 of the present invention can be used to automatically assess and fixture a wide variety of parts for CNC lathe machining using an automatically designed bushing. For the wide classes of parts which pass the verification algorithms 62, 66, 68, the present invention 27 eliminates the considerable work in determining how to custom fixture the custom part. Further, with the analysis and generation of tool paths 40, 42 being automatically performed by computer analysis of the customer's CAD file 30, the software can automatically providing a quotation for manufacture of the part, in which analysis of the CAD file 30 to generate machining instructions 42 for the bushing is performed prior to providing the quotation to the customer.

Although the present invention has been described with reference to preferred embodiments, workers skilled in the art will recognize that changes may be made in form and detail without departing from the spirit and scope of the invention. For instance, the present invention can be used without running all the verification algorithms. Additionally, the automation provided by the present invention can be achieved even if all the analysis is not done by the computer but rather a person reviewing the customer's CAD file determines what computer programs to run. For instance, a person may make the initial determination of whether the part will be CNC lathe turned using the bushing with its tool path computer generated in accordance with the present invention.

The invention claimed is:

1. A method of automated, custom lathe machining of a part, the method comprising:
   receiving a CAD file from a customer for the part, the CAD file defining a part surface profile having a characteristic longitudinal axis;
   analyzing the CAD file to generate machining instructions for the part on a CNC lathe which rotates the part about its characteristic longitudinal axis, the machining instructions having a first machining direction and a second machining direction, with the characteristic longitudinal axis being reversed for the second machining direction, such that the first machining direction machines an end of stock to define a first end of the part, with the first end of the part being held in the CNC lathe during the second machining direction which machines an opposing end of stock to define a second end of the part;
   analyzing the CAD file to generate machining instructions for a bushing for the part, at least a portion of the machining instructions defining an inside diameter of the bushing which mates with an outside diameter on the first end of the part;
   machining the first end of the part on the CNC lathe;
   machining the bushing on the CNC lathe;
   inserting the first end of the part into the bushing in a mating relationship;
   securing the bushing in the CNC lathe; and
   machining the second end of the part on the CNC lathe while the part is being held in the CNC lathe by the bushing.

2. The method of claim 1, wherein the first machining direction covers machining at least 50% of a length of the part for all CNC lathe machined parts.

3. The method of claim 1, wherein the act of analyzing the CAD file to generate machining instructions for the bushing comprises performing an area-of-contact analysis relative to a maximum permissible stress on the part.

4. The method of claim 3, wherein the maximum permissible stress depends upon a material of stock for the part.

5. The method of claim 1, wherein the act of analyzing the CAD file to generate machining instructions for the bushing comprises performing a torque analysis on machining for the second machining direction.

6. The method of claim 1, further comprising forming a compression slot in the bushing.

7. The method of claim 1, wherein the bushing comprises a first inner diameter and a second inner diameter shallower into the bushing than the first inner diameter, the second inner diameter being larger than the first inner diameter.

8. The method of claim 1, wherein the bushing is machined from the same stock as the part.

9. The method of claim 8, further comprising cutting the part off from the stock.

10. The method of claim 9, further comprising cutting the bushing off from the stock.

11. The method of claim 1, wherein the act of analyzing the CAD file to generate machining instructions for the part is performed automatically by a computer.

12. The method of claim 1, wherein the act of analyzing the CAD file to generate machining instructions for the bushing is performed automatically by a computer.

13. The method of claim 12, further comprising automatically providing a quotation for manufacture of the part, wherein the act of analyzing the CAD file to generate machining instructions for the bushing is performed prior to providing the quotation to the customer.

14. The method of claim 1, further comprising automatically providing a quotation for manufacture of the part, wherein the quotation varies based upon the machinability of the bushing.

15. The method of claim 1, wherein the bushing comprises an interior stop wall which extends at an angle to the characteristic longitudinal axis, wherein inserting the first end of the part into the bushing creates contact between the interior stop wall and the part to longitudinally register the part relative to the bushing.

16. The method of claim 15, further comprising longitudinally registering the bushing relative to the CNC lathe.

17. A method of automated, custom lathe machining of a part, the method comprising:
   receiving a CAD file from a customer for the part, the CAD file defining a part surface profile having a characteristic longitudinal axis;

generating machining instructions for the part on a CNC lathe which rotates the part about its characteristic longitudinal axis, the machining instructions having a first machining direction and a second machining direction, with the characteristic longitudinal axis being reversed for the second machining direction, such that the first machining direction machines an end of stock to define a first end of the part, with the first end of the part being held in the CNC lathe during the second machining direction;

generating machining instructions for a bushing for the part, at least a portion of the machining instructions defining an inside diameter of the bushing which mates with an outside diameter on the first end of the part;

machining the first end of the part on the CNC lathe from the stock;

cutting the part from the stock;

machining the bushing on the CNC lathe from the stock;

cutting the bushing from the stock;

inserting the first end of the part into the bushing in a mating relationship;

securing the bushing in the CNC lathe; and machining the second end of the part on the CNC lathe while the part is being held in the CNC lathe by the bushing.

18. The method of claim 17, wherein the part is machined on the same CNC lathe as the bushing.

19. The method of claim 18, wherein the bushing is machined from the same piece of stock as the part, and wherein the bushing is machined and cut from the stock, the stock is advanced in the CNC lathe, and the part is machined and cut from the advanced stock.

20. A method of automated, custom lathe machining of a part, the method comprising:

machining a first end of a part using a first machining direction on a CNC lathe by rotating stock about a characteristic longitudinal axis;

machining a bushing for holding the part during CNC lathe machining a second end of the part, the bushing comprising:
- an outer profile defining a characteristic longitudinal axis;
- a through-bore on the longitudinal axis;
- a CNC lathe machined inside diameter about the longitudinal axis, the inside diameter being dimensioned to receive the first end of the part in a mating relationship,
- a stop wall which extends at an angle to the characteristic longitudinal axis; the stop wall intersecting either or both of the through-bore or the inside diameter at an edge; and
- a longitudinally extending compression slot extending from the cylindrical outer profile to the through-bore; and CNC lathe machining the second end of the part using a second machining direction by rotating the part about the characteristic longitudinal axis, with the characteristic longitudinal axis being reversed for the second machining direction as compared to the first machining direction, with the first end of the part being held in the CNC lathe using the bushing during CNC lathe machining in the second machining direction.

* * * * *